Jan. 4, 1955    J. L. COMMON ET AL    2,698,803
STARCH COMPOSITION
Filed June 24, 1952
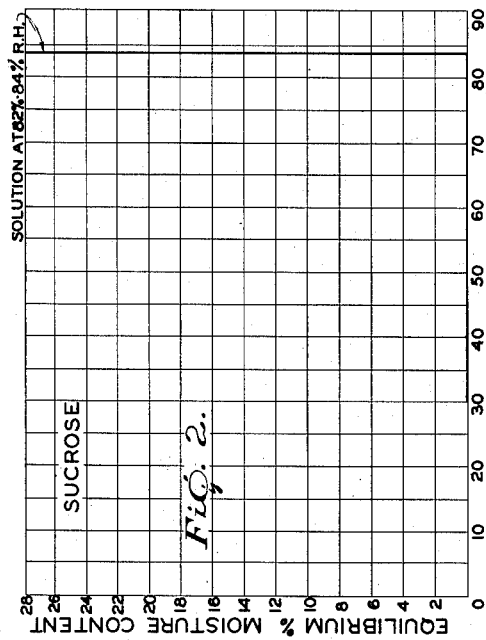
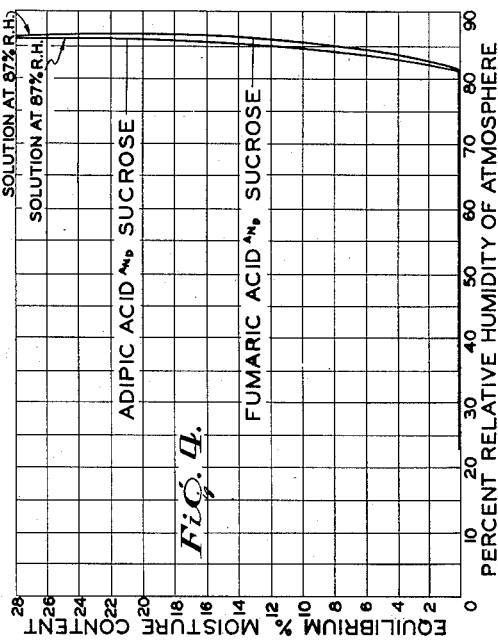
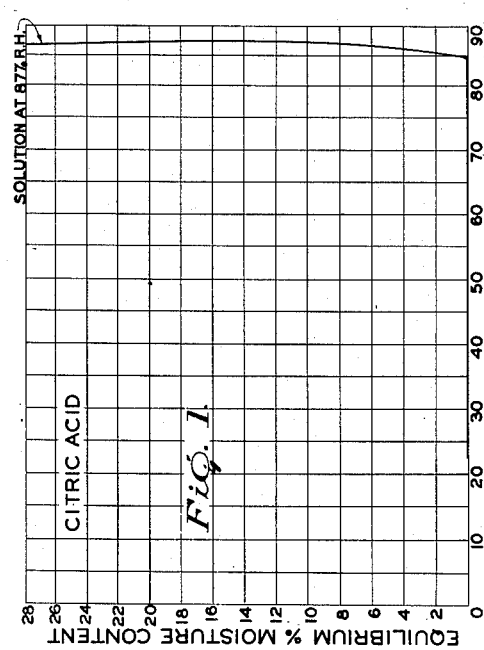
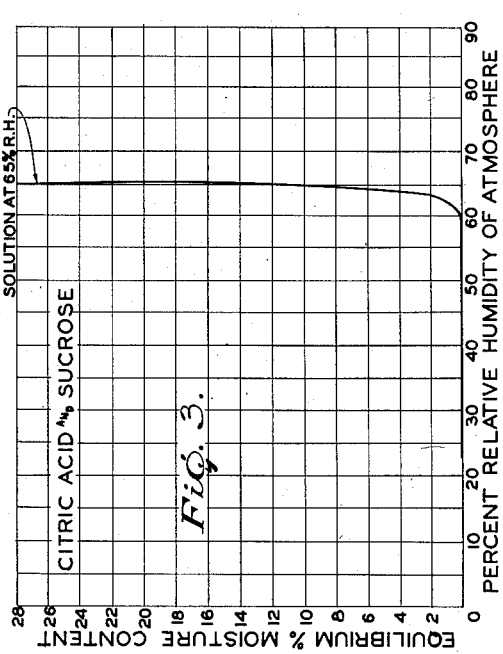
INVENTOR
Harold A. Campbell
James Lincoln Common
BY Cameron, Kerkam & Sutton
ATTORNEYS United States Patent Office 2,698,803
Patented Jan. 4, 1955

2,698,803

STARCH COMPOSITION

James Lincoln Common, Rutherford, and Harold A. Campbell, Denville, N. J., assignors to General Foods Corporation, New York, N. Y., a corporation of Delaware Application June 24, 1952, Serial No. 295,262

5 Claims. (Cl. 99—139)

This invention relates to starch-sugar food products and more particularly to starch products used for pie fillings, puddings and the like which employ a food acid to provide a tart taste to the product.

Numerous products of the above nature are presently on the market. Ordinarily they are comprised of corn starch, sugar, flavoring material, coloring material and citric acid. The citric acid or other acid ingredient of such mixtures plays an important role in that it is necessary to impart tartness to the product. Other considerations than tartness, however, are equally important in determining the suitability of an acid for use in such products. For practical reasons it is preferable that the acid be solid at ordinary temperatures particularly in those cases where the product is prepared in a form of a dry powder. It must also be edible and in addition soluble in the proportions used in preparing the finished product. Moreover, the acid should be compatible with the desired flavor of the finished product to the extent of not imparting any off taste thereto.

By way of example, the usual commercial lemon pie filling mixture contains starch, sugar, citric acid, a citrus oil flavoring material and coloring material. The housewife adds egg yolk and water and boils the mixture until the starch is substantially completely gelatinized whereupon the mixture is poured into a pie shell and allowed to cool, thus forming a uniform gel.

In cooking large amounts of puddings, pie fillings and the like containing citric acid, for example in institutional or restaurant use, the time of cooking is extremely important. Over-cooking results in over-gelatinization and degradation of the starch and thus in serious loss of gel strength. In cooking small amounts, as for example by the housewife, such loss of gel strength is compensated by evaporation of moisture during cooking which produces a more concentrated solution but the problem reaches serious proportions in the aforementioned institutional and restaurant use.

The principal difficulty encountered by industry in regard to pie fillings, puddings and like preparations, however, is the limited keeping quality of the powdered mixture. It is known that if such a mixture is allowed to remain on the grocer's shelf for over three months in the high temperature-high humidity coastal areas, or for over nine months in areas subjected to less severe conditions, the product becomes completely unacceptable for household use. It has been noted that during the course of storage the starch progressively loses its ability to gel. After the required gelatinization and cooking, the consistency of the gel will range from "pourable" to "thin," depending upon the severity of the aforementioned temperature and humidity conditions and the length of time the mixture is subjected to the same.

Accompanying the degradation are a decrease in flavor intensity and sometimes the development of an off-flavor. This is particularly true in the case of the citrus flavors.

It has been determined that the principal cause for the failure of these starch products is the presence of citric acid in contact with starch and sugar. To date the only solution of the problem found by industry consists in removing the citric acid from the mixture and furnishing it to the housewife separately usually in the form of a tablet. Such products have been marketed instead of the more desirable intimate mixture in an attempt to solve the above problem, but they have had serious disadvantages. For instance, such a procedure is not adaptable to a product which is not to be used completely at one time. Furthermore, the solubility of the tablet obviously depends upon the degree of compression thereof and there is the consequent possibility of over compression resulting in a loss of total citric acid effect in the final product. Incomplete solution of the tablet is frequently found during cooking. Another principal disadvantage is the packaging problem which requires that a single small tablet be placed in each package. Many times packages are found containing no citric acid tablet whereas others contain two or three.

An object of the present invention is to provide a mixture of starch, sugar and acid which may be stored for extended periods of time without material deterioration.

Another object is to make feasible the intimate mixture of the acid with the starch and sugar thereby eliminating the use of an acid tablet.

Another object is to provide an intimate mixture of starch, sugar, flavoring material and acid which does not exhibit a decrease in flavor intensity or develop off-flavors during storage.

Still another object is to provide a starch, sugar and acid mixture which does not undergo degradation when stored for long periods of time.

Still another object is to provide a starch, sugar and acid mixture having improved gelling characteristics especially when cooked in large batches.

Still another object is to provide a starch, sugar and acid mixture which may be cooked under less critical conditions in large batches.

These and other objects will be apparent from the following detailed description of the invention.

It has now been discovered that the above objects can be achieved by employing either adipic or fumaric acid as the acid ingredient of a starch acid mixture. These acids are solid at ordinary temperatures and edible and soluble in the proportions required to produce the desired tartness, and they do not impart an off taste to the finished product.

Figure 1 represents the effect on the equilibrium moisture content of citric acid of increasing degrees of relative humidity.

Figure 2 represents the effect on the equilibrium moisture content of sucrose of increasing degrees of relative humidity.

Figure 3 represents the effect of increasing degrees of relative humidity on the equilibrium moisture content of a mixture of sucrose and citric acid.

Figure 4 represents the effect of increasing degrees of relative humidity on the equilibrium moisture content of mixtures of adipic acid and sucrose and fumaric acid and sucrose.

It has been found that the short storage life of starch-sugar products containing citric acid as the acid ingredient can not be predicated simply on the physical properties of the acid. Figure 1 shows that when citric acid alone is allowed to stand until moisture equilibrium is reached at increasing relative humidities, the moisture pick-up of the acid is insignificant until about 85% relative humidity is reached. At this point the citric acid quickly picks up enough moisture to be in complete solution at 87% relative humidity. Figure 2 indicates approximately the same breaking point for sucrose alone. When, however, sucrose and citric acid are mixed and subjected to the same test the breaking point is at about 62% as shown in Figure 3. The explanation for this finding is unknown.

In the case of mixtures of fumaric or adipic acid with sucrose as shown in Figure 4, however, the breaking point is not reached until about 84% relative humidity and 83% relative humidity respectively.

The above finding is substantiated by the fact that intimate mixtures of starch, sugar and adipic or fumaric acid remain unaffected by high humidity and high temperature for a period of time up to four times the period within which the same starch product employing citric acid will fail. For example, a starch dessert employing corn starch, sugar, flavoring and adipic acid was stored at 90° F. and 85% relative humidity for 21 days and thereafter made into a dessert of the same quality, consistency and appearance as a dessert made from the same product prior to any storage whatsoever. On the other hand when a mixture of starch, sugar, flavoring and citric acid was stored for five days under the same conditions, the dessert made therefrom had a very weak consistency and consequently was not acceptable, and when the time was increased to seven days it would not even set to a gel but remained "pourable." If, however, the citric acid mixture was made into a dessert prior to storage the product was acceptable. All the samples were at like moisture content at the beginning of storage.

Under the more normal conditions obtaining in practice, it is found that the adipic and fumaric acid samples will withstand storage for what have heretofore been considered impossible lengths of time. For example, samples stored under the severe storage conditions of Houston, Texas, resulted in failures after only three months for the citric acid samples whereas the adipic acid samples were still good after being held for twelve months.

Additionally it has been found that in the course of cooking or gelatinizing large batches of starch-acid products containing adipic acid as the acid ingredient, no serious degradation of the starch takes place even though cooking is continued over long periods of time. When citric acid is employed for even the minimum cooking time required in large batches, degradation becomes noticeable as exhibited by a relatively weak pudding. Slight over-cooking increases the degradation considerably. On the other hand cooking with adipic acid may be continued for so long a time without causing degradation that cooking time is unimportant for any practical purposes. It is obvious, of course, that if the citric acid-starch product has been stored for any length of time the problem is considerably greater in that cooking tolerance is reduced even further. Since in the case of adipic and fumaric acid no degradation takes place during any practical storage time or during any practical cooking time the problem of cooking time, tolerance in large batches is completely eliminated under practically all conditions and greatly improved results are obtained after extended storage.

As noted before flavor problems develop simultaneously with degradation in starch-acid products employing citric acid. The flavor intensity becomes weaker and in some cases distinct off flavors develop. It is unknown whether or not this is as a result of the products of starch or sucrose degradation; however, no flavor problems have been detected for any length of storage time when adipic or fumaric acid has been used as the acid ingredient.

In practicing the present invention it is only necessary to physically admix the adipic or the fudmaric acid or any combination thereof with starch, sugar, flavor material or other acids or buffer salts as desired. Likewise materials producing the acids in solution such as anhydride may be used. It is preferred, however, to use each acid by itself and is generally unnecessary to use other acids or buffer salts.

The amount of acid used depends only upon the degree of tartness desired. Generally the package ordinarily marketed should contain about 3¼ ounces of material. Adipic acid may vary from 2.25 to 3.75 grams and fumaric acid may range from 1.5 to 2.5 grams. As noted before, however, these figures are based merely on taste requirements, the greater the amount of acid the greater the amount of tartness.

It is obvious that a composition including only adipic or fumaric acid and starch could be marketed, leaving the addition of sugar, flavoring, etc., to the consumer.

The following examples represent the preferred embodiments of the present invention as applied to lemon pie fillings.

*Example 1*

| | Grams |
|---|---|
| Corn starch | 35.0 |
| Sucrose | 52.0 |
| Adipic acid | 3.0 |
| Coloring material | 0.3 |
| Lemon flavor | 1.0 |
| Salt | 1.0 |

The above mixture when stored for over twenty days at 85% relative humidity and 90° F. produced a lemon pie filling substantially identical to a pudding prepared from the same mixture without any storage.

Both puddings were prepared by mixing two slightly beaten egg yolks with ¼ cup of water and adding the above ingredients along with an additional ½ cup of sugar. The ingredients were mixed well and 1¾ cups of water were added gradually with constant stirring until brought to a boil and then removed from heat. Time to reach a boil required about 5 minutes.

*Example 2*

| | Grams |
|---|---|
| Corn starch | 35.0 |
| Sucrose | 53.0 |
| Fumaric acid | 2.0 |
| Coloring material | 0.3 |
| Lemon flavor | 1.0 |
| Salt | 1.0 |

The above mixture when stored for over twenty days at 85% relative humidity and 90° F. produced a lemon pie filling substantially identical to a pudding prepared from the same mixture without any storage.

Both puddings were prepared by mixing two slightly beaten egg yolks with ¼ cup of water and adding the above ingredients along with an additional ½ cup of sugar. The ingredients were mixed well and 1¾ cups of water were added gradually with constant stirring until brought to a boil and then removed from heat. Time to reach a boil required about 5 minutes.

Many variations of the composition and of the amount of adipic or fumaric acid which may be used will be apparent to those skilled in the art without departing from the spirit of the present invention and reference should be made to the appended claims for a definition of the limits of the invention.

What is claimed is:

1. A food product of the class described consisting essentially of starch, sugar, and an acid selected from the group consisting of adipic and fumaric acids.

2. A food product of the class described in the form of an intimate mixture consisting essentially of starch, sugar, and an acid selected from the group consisting of adipic and fumaric acids.

3. A food product of the class described consisting essentially of starch, sugar, and a material which in aqueous solution will provide an acid selected from the group consisting of adipic and fumaric acids.

4. A dry mixture of comminuted edible materials adapted to form a gel upon cooking with water and consisting essentially of starch as its jellifying ingredient together with sugar, flavor, and an acid of the group consisting of adipic and fumaric acids, the proportion of starch to acid being in the range of from about 10 :1 to about 35:1 parts by weight.

5. The composition of claim 4 having the ingredients starch, sugar, flavor, and acid in the ratio of about 35:50:1:3 parts by weight, respectively.

References Cited in the file of this patent

UNITED STATES PATENTS

| | | |
|---|---|---|
| 2,406,585 | Buchanan et al. | Aug. 27, 1946 |
| 2,435,249 | Zenes | Feb. 3, 1948 |
| 2,563,996 | Edgar | Aug. 14, 1951 |
| 2,609,298 | Kirby | Sept. 2, 1952 |